United States Patent [19]
Yamakawa

[11] Patent Number: 6,018,410
[45] Date of Patent: Jan. 25, 2000

[54] IMAGE READOUT IMAGING LENS AND IMAGE READOUT APPARATUS

[75] Inventor: Hiromitsu Yamakawa, Omiya, Japan

[73] Assignee: Fuji Photo Optical Co., Ltd., Saitama, Japan

[21] Appl. No.: 09/012,914

[22] Filed: Jan. 23, 1998

[30] Foreign Application Priority Data

Mar. 7, 1997 [JP] Japan .................................. 9-070401

[51] Int. Cl.$^7$ .................................................. G02B 26/08
[52] U.S. Cl. ............................ 359/205; 359/784; 359/785
[58] Field of Search .................................. 359/205, 689, 359/690, 784, 785

[56] References Cited

U.S. PATENT DOCUMENTS 5,568,322  10/1996  Azami et al. ............................ 359/785
5,589,989  12/1996  Estelle et al. ........................... 359/785

FOREIGN PATENT DOCUMENTS 2-42411  2/1990  Japan .
2-39765  9/1990  Japan .

Primary Examiner—James Phan
Attorney, Agent, or Firm—Snider & Associates; Ronald R. Snider

[57] ABSTRACT

A first lens made of a positive meniscus lens having a convex surface directed onto the object side, a second lens made of a biconcave lens, and a third lens made of a biconvex lens are successively disposed from the object side, and predetermined conditional expressions are satisfied, thus yielding an image readout imaging lens suitable for reading out the shorter side of A4—sized color originals and the like. Successively from the object side, a first lens $L_1$ made of a positive meniscus lens having a convex surface directed onto the object side, a second lens $L_2$ made of a biconcave lens, and a third lens $L_3$ made of a biconvex lens are disposed, and the following conditional expressions (1) to (5) are satisfied:

$-0.36f < f_2 < -0.25f$     (1)

$-1.07 < f_2/f_3 < -0.74$     (2)

$0.26f < r_4 < 0.32f$     (3)

$0.43 < r_4/r_5 < 0.77$     (4)

$0.82 < r_1/r_4 < 1.05$     (5)

4 Claims, 4 Drawing Sheets

EXAMPLE 1
(A)
F/5.5

SPHERICAL ABERRATION (mm)

EXAMPLE 1
(B)
ω = 18.8°

ASTIGMATISM (mm)

EXAMPLE 1
(C)
ω = 18.8°

DISTORTION (%)

EXAMPLE 2
(A)
F/5.5
SPHERICAL ABERRATION (mm)

EXMPLE 2
(B)
ω=18.8°
ASTIGMATISM (mm)

EXAMPLE 2
(C)
ω=18.8°
DISTORTION (%)

EXAMPLE 3
(A)
F/5.5
SPHERICAL ABERRATION (mm)

EXAMPLE 3
(B)
ω=18.8°
ASTIGMATISM (mm)

EXAMPLE 3
(C)
ω=18.8°
DISTORTION (%)

IMAGE READOUT IMAGING LENS AND IMAGE READOUT APPARATUS

RELATED APPLICATIONS

This application claims the priority of Japanese Patent Application 9-70401 filed on Mar. 7, 1997, which is incorporated herein by reference.

BACKGROUND OF THE INVENTION

1. Field of the Invention

The present invention relates to an image readout apparatus such as facsimile or image scanner, and an image readout imaging lens used in its optical system.

2. Description of the Prior Art

Conventionally known as an image readout imaging lens used in the optical system of the image readout apparatus is an imaging lens composed of three lens sheets such as that disclosed in Japanese Patent Publication No. 2-39765 or that disclosed in Japanese Unexamined Patent Publication No. 2-42411.

In order to read out a region extending over the whole width of the shorter side of an A4-sized color original, for example, desired is an imaging lens which can secure a considerably large angle of view while suppressing image surface curvature and is as bright as possible.

In the imaging lens disclosed in the above-mentioned Japanese Patent Publication No. 2-39765, however, since the angle of view is made large, image surface curvature is so large that it is difficult to form three color images of blue, green, and red in the vicinity of the same plane. On the other hand, in the imaging lens disclosed in the above-mentioned Japanese Unexamined Patent Publication No. 2-42411, though F number is 2 and thus is bright, the apparatus tends to have a large size since the angle of view is small.

Thus, the conventional imaging lenses have not been satisfactory in terms of attaining a considerably large angle of view while suppressing image surface curvature, and brightness. Consequently, they have not always been suitable for reading out the shorter side of A4-sized color originals.

SUMMARY OF THE INVENTION

In view of such circumstances, it is an object of the present invention to provide an image readout imaging lens and image readout apparatus suitable for reading out the shorter side of A4-sized color originals and the like.

The image readout imaging lens in accordance with the present invention comprises, successively from an object side, a first lens made of a positive meniscus lens having a convex surface directed onto the object side, a second lens made of a biconcave lens, and a third lens made of a biconvex lens, wherein the following conditional expressions (1) to (5):

$$-0.36f < f_2 < -0.25f \quad (1)$$

$$-1.07 < f_2/f_3 < -0.74 \quad (2)$$

$$0.26f < r_4 < 0.32f \quad (3)$$

$$0.43 < r_4/r_5 < 0.77 \quad (4)$$

$$0.82 < r_1/r_4 < 1.05 \quad (5)$$

wherein
 f is a focal length of the whole system;
 $f_2$ is a focal length of the second lens;
 $f_3$ is a focal length of the third lens;
 $r_1$ is a radius of curvature of the first surface;
 $r_4$ is a radius of curvature of the fourth surface; and
 $r_5$ is a radius of curvature of the fifth surface are satisfied.

Preferably, in this configuration, the following conditional expressions (6) and (7):

$$0.018f < d_2 < 0.026f \quad (6)$$

$$0.75f < f_1 < 1.33f \quad (7)$$

wherein
 $d_2$ is an axial air gap between the first and second lenses; and
 $f_1$ is a focal length of the first lens are satisfied.

Further, each lens is preferably constituted by a material which contains neither lead nor arsenic.

The image readout apparatus in accordance with the present invention comprises the above-mentioned image readout imaging lens.

As mentioned above, in accordance with the present invention, successively from the object side, the first lens made of a positive meniscus lens having a convex surface directed onto the object side, the second lens made of a biconcave lens, and the third lens made of a biconvex lens are disposed while the above-mentioned conditional expressions (1) to (5) are satisfied, thus making it possible to obtain a bright imaging lens which can secure a considerably large angle of view while suppressing image surface curvature. Accordingly, when this imaging lens is incorporated in an image readout apparatus so as to be used for reading out images, the shorter side of A4-sized color originals and the like can be read out appropriately.

In this case, the above-mentioned conditional expressions (1) to (5) are preferably satisfied due to the following reasons.

Outside the upper or lower limit of conditional expression (1), it becomes difficult to correct image curvature of coma and chromatic aberration in balance.

Above the upper limit of conditional expression (2), image surface curvature is corrected less. Below the lower limit thereof, image surface curvature is corrected too much. In either cases, astigmatism cannot be corrected favorably.

Above the upper limit of conditional expression (3) or (5), coma is corrected less. Below the lower limit thereof, coma is corrected too much. In these cases, as with conditional expression (1), the balance with chromatic aberration deteriorates.

Above the upper limit of conditional expression (4), coma is corrected less. Below the lower limit thereof, coma is corrected too much. In either cases, favorable imaging performances cannot be obtained.

The above-mentioned conditional expressions (6) and (7) are more preferably satisfied as well due to the following reasons.

Above the upper limit of conditional expression (6), image surface curvature becomes large, and coma deteriorates, so that favorable imaging performances may not be obtained. Below the lower limit thereof, on the other hand, first and second lenses come so close to each other that sufficient effective diameter may not be obtained with respect to a luminous flux.

Outside the upper or lower limit of conditional expression (7), as with conditional expression (1), it becomes difficult to correct image surface curvature or coma and chromatic aberration in balance.

In the configuration mentioned above, when each of the lenses is constituted by a material which contains neither lead nor arsenic (so-called eco-glass species), the image readout imaging lens can have a lighter weight, and even when the lens is discarded, its adverse effect on the environment can be minimized.

DESCRIPTION OF THE PREFERRED EMBODIMENTS

In the following, embodiments of the present invention will be explained.

Figure 1:
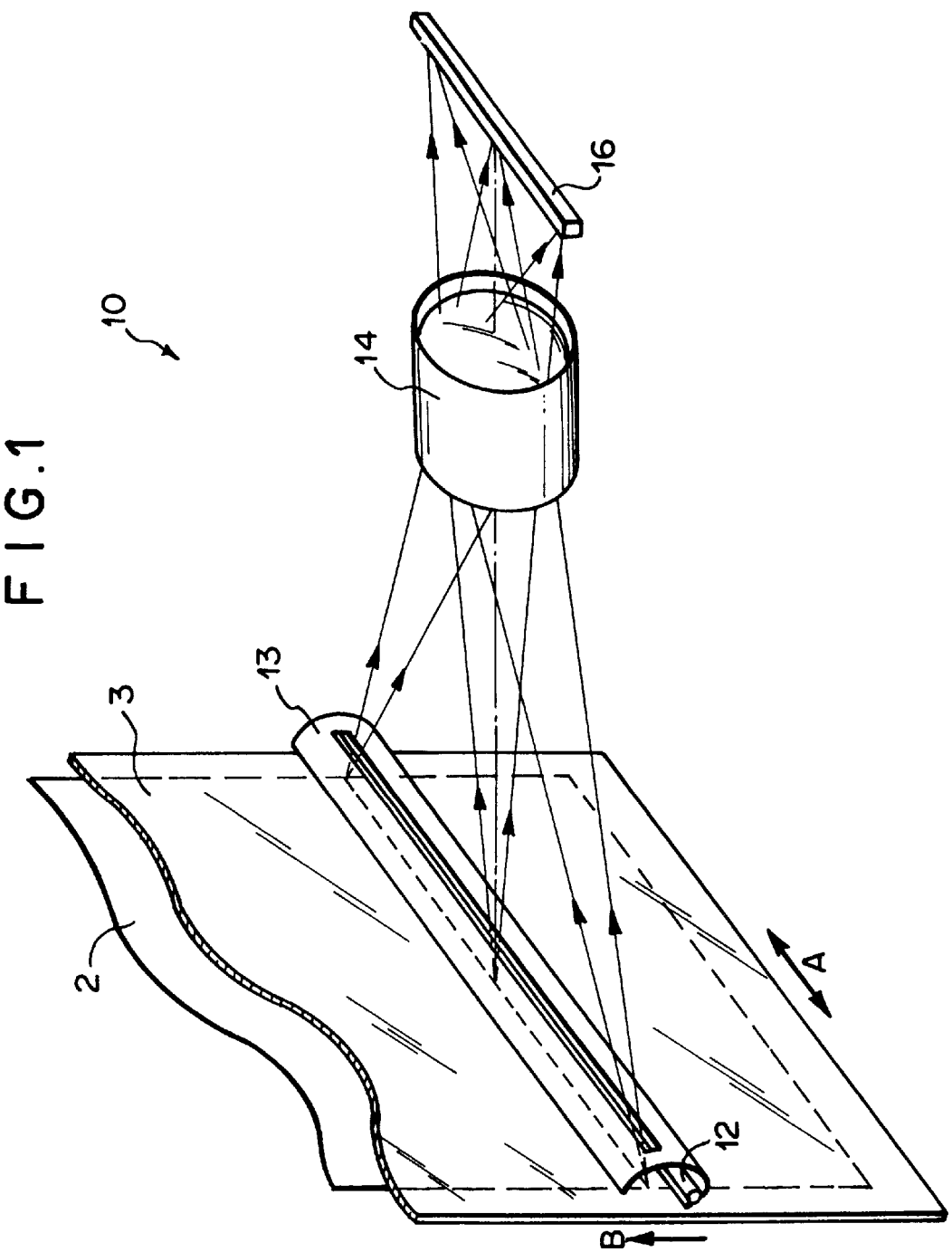
FIG. 1 is a perspective view showing an image readout apparatus equipped with an image readout imaging lens in accordance with an embodiment of the present invention.

FIG. 1 is a perspective view showing an image readout apparatus equipped with an image readout imaging lens in accordance with an embodiment of the present invention.

As depicted, in this image readout apparatus 10, a color original 2 placed on a surface of a glass plate 3 is irradiated with light in a band-like form by means of a linear or linearly-arranged light source (fluorescent light, halogen lamp, LED, and the like) 12 and a reflector 13 along directions of arrow A (shorter side direction), and its reflected luminous flux is converged by an image readout imaging lens 14 so as to form an image on image sensors (CCDs) 16 arranged in one to three rows, whereby the information of the color original 2 in the directions of arrow A (on the shorter side) is read out.

Further, the original 2 is relatively moved in the direction of arrow B with respect to the image readout imaging lens 14, so that the information of the original 2 is read out.

Figure 2:
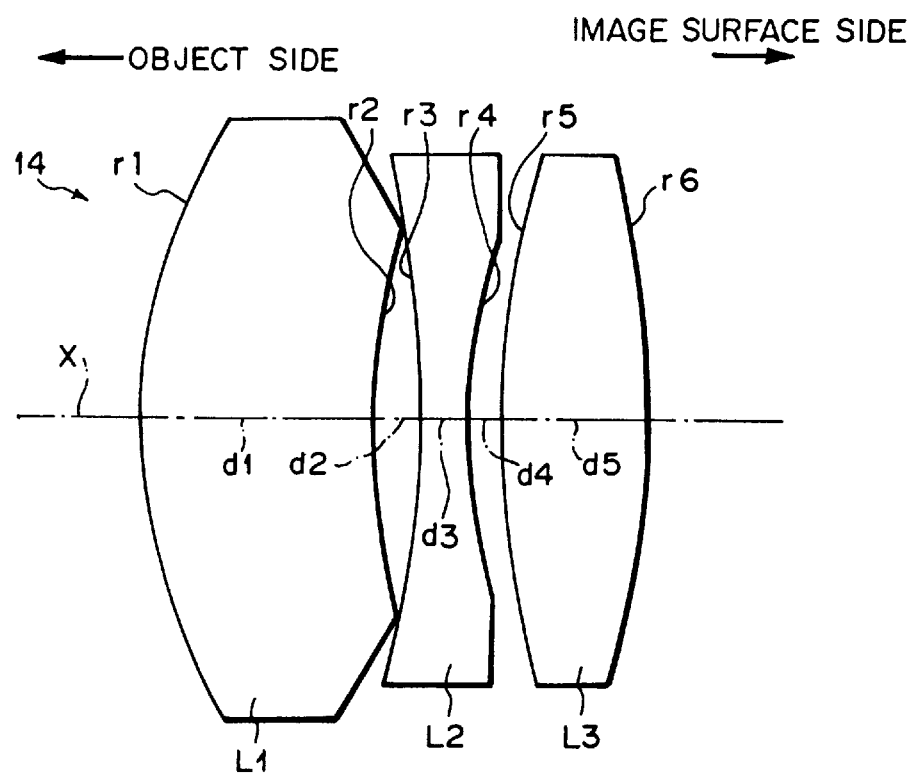
FIG. 2 is a lens configurational view showing the above-mentioned image readout imaging lens.

In this image readout apparatus 10, the imaging lens 14 is required to have an angle of view by which one side (shorter side) of the color original 2 in the directions A can be encompassed. In order to enable this feature, the imaging lens 14 has a lens configuration shown in FIG. 2.

Namely, the imaging lens comprises, successively from the object side, a first lens $L_1$ made of a positive meniscus lens having a convex surface directed onto the object side, a second lens $L_2$ made of a biconcave lens, and a third lens $L_3$ made of a biconvex lens, while satisfying the following conditional expressions (1) to (7):

$$-0.36f < f_2 < -0.25f \quad (1)$$

$$-1.07 < f_2/f_3 < -0.74 \quad (2)$$

$$0.26f < r_4 < 0.32f \quad (3)$$

$$0.43 < r_4/r_5 < 0.77 \quad (4)$$

$$0.82 < r_1/r_4 < 1.05 \quad (5)$$

$$0.018f < d_2 < 0.026f \quad (6)$$

$$0.75f < f_1 < 1.33f \quad (7)$$

wherein
 f is a focal length of the whole system;
 $f_1$ is a focal length of the first lens;
 $f_2$ is a focal length of the second lens;
 $f_3$ is a focal length of the third lens;
 $r_1$ is a radius of curvature of the first surface;
 $r_4$ is a radius of curvature of the fourth surface;
 $r_5$ is a radius of curvature of the fifth surface; and
 $d_2$ is an axial air gap between the first and second lenses.

In the following, Examples 1 to 5 of the image readout imaging lens in accordance with the present invention will be explained.

The image readout imaging lens in accordance with each example is standardized at a focal length of 100 mm. In order to be actually used in an image readout apparatus, each imaging lens is proportionally reduced or enlarged so as to match the size of an original to be read out, and it is used with a focal length determined for each original size. Each of these imaging lenses is optimal for reading out an original having a shorter side of about 216 mm corresponding to A4 or letter size. In this case, their focal length will be proportionally reduced to about 27.4 mm in practice.

EXAMPLE 1

Table 1 (follows) shows radius of curvature r (mm) of each lens surface in the image readout imaging lens, center thickness of each lens and air gap between adjacent lenses (hereinafter collectively referred to as axial surface spacing) d (mm), refractive index $N_d$ and Abbe number $\nu_d$ of each lens at d-line, and material (product name) constituting each lens in accordance with this example. In Table 1, numbers successively increase from the object side.

Also, Table 2 (follows) shows specific values of $r_4$, $f_2$, $f_2/f_3$, $r_4/r_5$, $r_1/r_4$, $d_2$, and $f_1$ in the above-mentioned conditional expressions (1) to (7). Further, the lower part of Table 2 shows F number (FNo), focal length f of the whole system, magnification (β), and half angle of view (ω).

Figure 3:
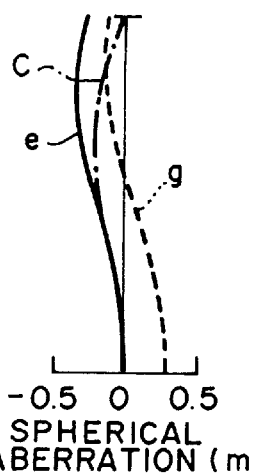
FIGS. 3 (A), (B) and (C) are aberration charts showing various kinds of aberration in the image readout imaging lens in accordance with Example 1 of the present invention.
Figure 3:
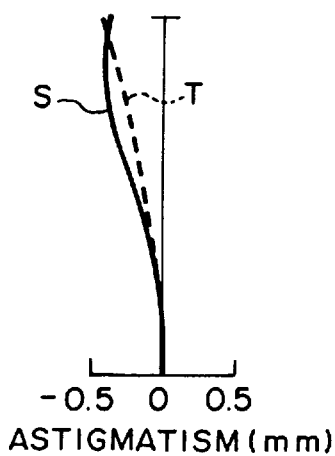
Figure 3:
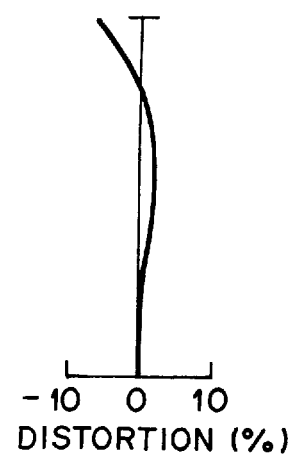

FIG. 3 is an aberration chart showing various kinds of aberration in the image readout imaging lens in accordance with this example. This aberration chart illustrates a case where the focal length is 100 mm, and a glass plate having a thickness of 11.7 mm and a glass plate having a thickness of 2.55 mm are respectively included on the object side and image surface side in its optical path.

As can be seen from this chart, an image readout imaging lens having a favorable imaging performance extending to the periphery of its visual field can be obtained in accordance with this example.

EXAMPLE 2

Table 3 (follows) shows radius of curvature r (mm) of each lens surface in the image readout imaging lens, axial surface spacing d (mm), refractive index $N_d$ and Abbe number $\nu_d$ of each lens at d-line, and material (product name) constituting each lens in accordance with this example. In Table 3, numbers successively increase from the object side.

Also, Table 4 (follows) shows specific values of $r_4$, $f_2$, $f_2/f_3$, $r_4/r_5$, $r_1/r_4$, $d_2$, and $f_1$ in the above-mentioned conditional expressions (1) to (7). Further, the lower part of Table 4 shows F number (FNo), focal length f of the whole system, magnification (β), and half angle of view (ω).

Figure 4:
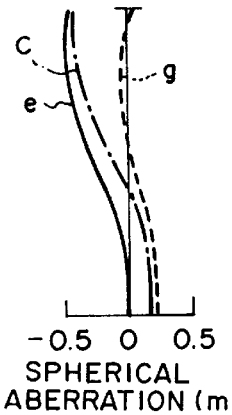
FIGS. 4 (A), (B) and (C) are aberration charts showing various kinds of aberration in the image readout imaging lens in accordance with Example 2 of the present invention.
Figure 4:
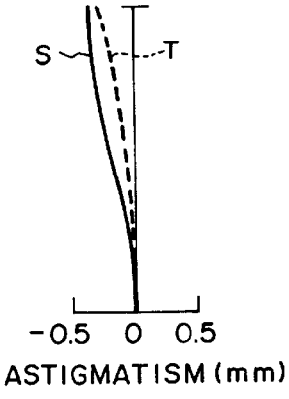
Figure 4:
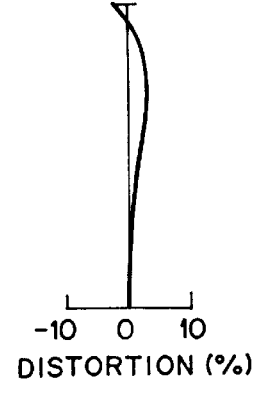

FIG. 4 is an aberration chart showing various kinds of aberration in the image readout imaging lens in accordance with this example. This aberration chart illustrates a case where the focal length is 100 mm, and a glass plate having a thickness of 11.7 mm and a glass plate having a thickness of 2.55 mm are respectively included on the object side and image surface side in its optical path.

As can be seen from this chart, an image readout imaging lens having a favorable imaging performance extending to the periphery of its visual field can be obtained in accordance with this example.

In this example, each lens is constituted by a material which contains neither lead nor arsenic (so-called eco-glass species), whereby the image readout imaging lens can have a lighter weight, and even when the lens is discarded, its adverse effect on the environment can be minimized.

EXAMPLE 3

Table 5 (follows) shows radius of curvature r (mm) of each lens surface in the image readout imaging lens, axial surface spacing d (mm), refractive index $N_d$ and Abbe number $\nu_d$ of each lens at d-line, and material (product name) constituting each lens in accordance with this example. In Table 5, numbers successively increase from the object side.

Also, Table 6 (follows) shows specific values of $r_4$, $f_2$, $f_2/f_3$, $r_4/r_5$, $r_1/r_4$, $d_2$, and $f_1$ in the above-mentioned conditional expressions (1) to (7). Further, the lower part of Table 6 shows F number (FNo), focal length f of the whole system, magnification (β), and half angle of view (ω).

Figure 5:
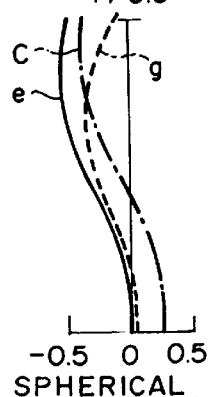
FIGS. 5 (A), (B) and (C) are aberration charts showing various kinds of aberration in the image readout imaging lens in accordance with Example 3 of the present invention.
Figure 5:
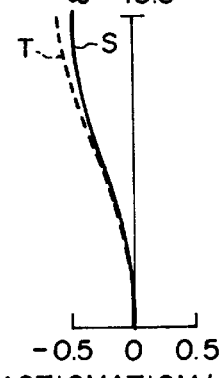
Figure 5:
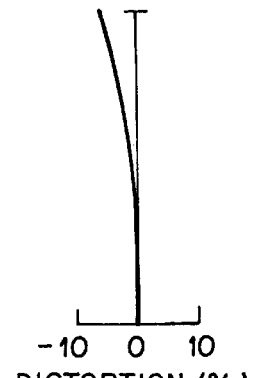

FIG. 5 is an aberration chart showing various kinds of aberration in the image readout imaging lens in accordance with this example. This aberration chart illustrates a case where the focal length is 100 mm, and a glass plate having a thickness of 11.7 mm and a glass plate having a thickness of 2.55 mm are respectively included on the object side and image surface side in its optical path.

As can be seen from this chart, an image readout imaging lens having a favorable imaging performance extending to the periphery of its visual field can be obtained in accordance with this example.

EXAMPLE 4

Table 7 (follows) shows radius of curvature r (mm) of each lens surface in the image readout imaging lens, axial surface spacing d (mm), refractive index $N_d$ and Abbe number $\nu_d$ of each lens at d-line, and material (product name) constituting each lens in accordance with this example. In Table 7, numbers successively increase from the object side.

Also, Table 8 (follows) shows specific values of $r_4$, $f_2$, $f_2/f_3$, $r_4/r_5$, $r_1/r_4$, $d_2$, and $f_1$ in the above-mentioned conditional expressions (1) to (7). Further, the lower part of Table 8 shows F number (FNo), focal length f of the whole system, magnification (β), and half angle of view (ω).

Figure 6:
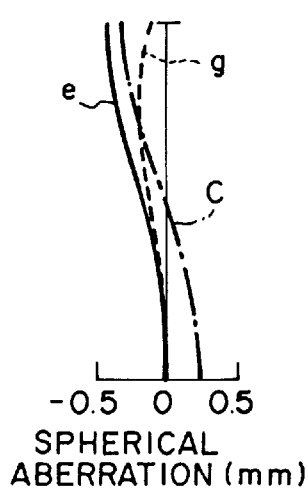
FIGS. 6 (A), (B) and (C) are aberration charts showing various kinds of aberration in the image readout imaging lens in accordance with Example 4 of the present invention.
Figure 6:
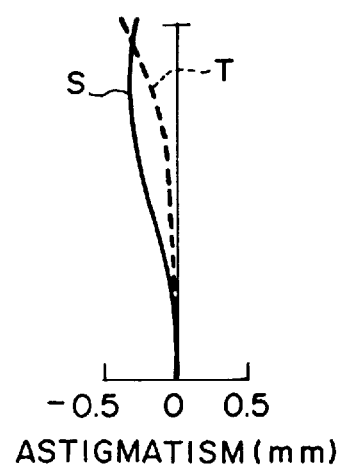
Figure 6:
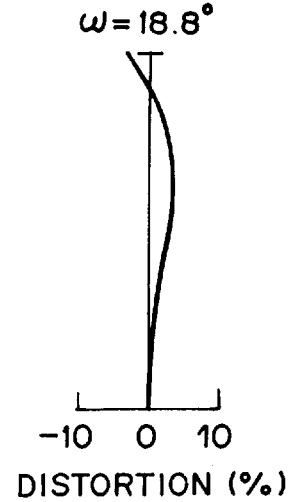

FIG. 6 is an aberration chart showing various kinds of aberration in the image readout imaging lens in accordance with this example. This aberration chart illustrates a case where the focal length is 100 mm, and a glass plate having a thickness of 11.7 mm and a glass plate having a thickness of 2.55 mm are respectively included on the object side and image surface side in its optical path.

As can be seen from this chart, an image readout imaging lens having a favorable imaging performance extending to the periphery of its visual field can be obtained in accordance with this example.

EXAMPLE 5

Table 9 (follows) shows radius of curvature r (mm) of each lens surface in the image readout imaging lens, axial surface spacing d (mm), refractive index $N_d$ and Abbe number $\nu_d$ of each lens at d-line, and material (product name) constituting each lens in accordance with this example. In Table 9, numbers successively increase from the object side.

Also, Table 10 (follows) shows specific values of $r_4$, $f_2$, $f_2/f_3$, $r_4/r_5$, $r_1/r_4$, $d_2$, and $f_1$ in the above-mentioned conditional expressions (1) to (7). Further, the lower part of Table 10 shows F number (FNo), focal length f of the whole system, magnification (β), and half angle of view (ω).

Figure 7:
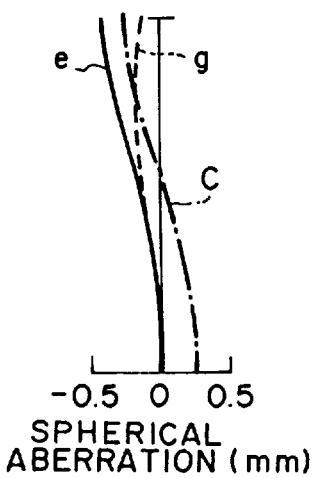
FIGS. 7 (A), (B) and (C) are aberration charts showing various kinds of aberration in the image readout imaging lens in accordance with Example 5 of the present invention.
Figure 7:
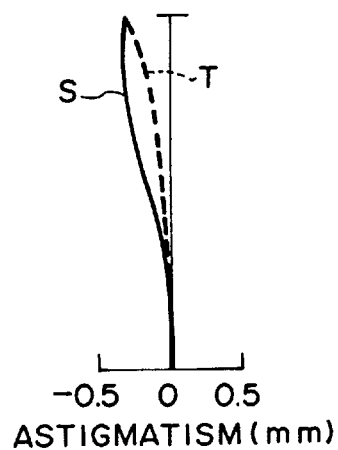
Figure 7:
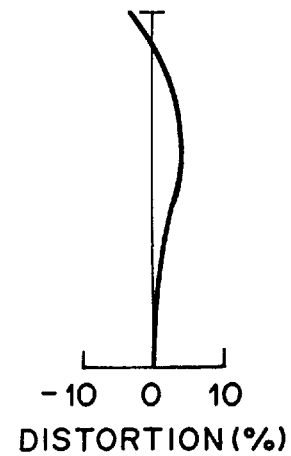

FIG. 7 is an aberration chart showing various kinds of aberration in the image readout imaging lens in accordance with this example. This aberration chart illustrates a case where the focal length is 100 mm, and a glass plate having a thickness of 11.7 mm and a glass plate having a thickness of 2.55 mm are respectively included on the object side and image surface side in its optical path.

As can be seen from this chart, an image readout imaging lens having a favorable imaging performance extending to the periphery of its visual field can be obtained in accordance with this example.

As explained in the foregoing, in accordance with the present invention, it is possible to obtain a bright imaging lens which can secure a considerably large angle of view while suppressing image surface curvature. When this imaging lens is incorporated in an image readout apparatus so as to be used for reading out images, the shorter side of A4-sized color originals and the like can be appropriately read out.

TABLE 1

| Surface | r | d | $N_d$ | $\nu_d$ | Product name of material |
|---|---|---|---|---|---|
| 1 | 28.778 | 11.908 | 1.71300 | 53.9 | LAK-8 (Sumita) |
| 2 | 40.437 | 2.331 | | | |
| 3 | −57.410 | 2.403 | 1.66680 | 33.1 | SF-19 (Sumita) |
| 4 | 30.853 | 1.821 | | | |
| 5 | 50.854 | 7.465 | 1.80325 | 46.7 | LASF-N6 (Sumita) |
| 6 | −50.854 | | | | |

TABLE 2

| | | | |
|---|---|---|---|
| $r_4$ | = 0.309f | | |
| $f_2$ | = −0.298f | | |
| $f_2/f_3$ | = −0.910 | | |
| $r_4/r_5$ | = 0.607 | | |
| $r_1/r_4$ | = 0.933 | | |
| $d_2$ | = 0.0233f | | |
| $f_1$ | = 0.982f | | |
| F/5.5 | f = 100 | β = −0.09449 | ω = 18.8° |

TABLE 3

| Surface | r | d | $N_d$ | $\nu_d$ | Product name of material |
|---|---|---|---|---|---|
| 1 | 28.524 | 11.900 | 1.71300 | 53.9 | S-LAL8 (Ohara) |
| 2 | 40.145 | 2.192 | | | |

TABLE 3-continued

| Surface | r | d | $N_d$ | $\nu_d$ | Product name of material |
|---------|---|---|-------|---------|--------------------------|
| 3 | −58.781 | 2.411 | 1.67270 | 32.1 | S-TIM25 (Ohara) |
| 4 | 30.996 | 1.824 | | | |
| 5 | 51.203 | 7.490 | 1.80400 | 46.6 | S-TIH65 (Ohara) |
| 6 | −51.203 | | | | |

TABLE 4

| | | | | |
|---|---|---|---|---|
| $r_4$ | = 0.310f | | | |
| $f_2$ | = −0.298f | | | |
| $f_2/f_3$ | = −0.906 | | | |
| $r_4/r_5$ | = 0.605 | | | |
| $r_1/r_4$ | = 0.920 | | | |
| $d_2$ | = 0.0219f | | | |
| $f_1$ | = 0.969f | | | |
| F/5.5 | f = 100 | β = −0.09449 | ω = 18.8° | |

TABLE 5

| Surface | r | d | $N_d$ | $\nu_d$ | Product name of material |
|---------|---|---|-------|---------|--------------------------|
| 1 | 28.865 | 10.788 | 1.71300 | 53.9 | LAK-8 (Sumita) |
| 2 | 36.620 | 1.889 | | | |
| 3 | −45.612 | 2.313 | 1.64769 | 33.9 | SF-2 (Sumita) |
| 4 | 31.543 | 0.983 | | | |
| 5 | 45.381 | 7.758 | 1.80325 | 46.7 | LASF-N6 (Sumita) |
| 6 | −45.381 | | | | |

TABLE 6

| | | | | |
|---|---|---|---|---|
| $r_4$ | = 0.315f | | | |
| $f_2$ | = −0.285f | | | |
| $f_2/f_3$ | = −0.969 | | | |
| $r_4/r_5$ | = 0.695 | | | |
| $r_1/r_4$ | = 0.915 | | | |
| $d_2$ | = 0.0189f | | | |
| $f_1$ | = 1.211f | | | |
| F/5.5 | f = 100 | β = −0.09449 | ω = 18.8° | |

TABLE 7

| Surface | r | d | $N_d$ | $\nu_d$ | Product name of material |
|---------|---|---|-------|---------|--------------------------|
| 1 | 28.132 | 11.352 | 1.77250 | 49.6 | LASF-n7 (Sumita) |
| 2 | 43.582 | 2.009 | | | |
| 3 | −88.536 | 2.411 | 1.68893 | 31.2 | SF-8 (Sumita) |
| 4 | 29.825 | 2.921 | | | |
| 5 | 61.317 | 7.490 | 1.80325 | 46.7 | LASF-N6 (Sumita) |
| 6 | −61.317 | | | | |

TABLE 8

| | | | | |
|---|---|---|---|---|
| $r_4$ | = 0.298f | | | |
| $f_2$ | = −0.321f | | | |
| $f_2/f_3$ | = −0.819 | | | |
| $r_4/r_5$ | = 0.486 | | | |
| $r_1/r_4$ | = 0.943 | | | |
| $d_2$ | = 0.0201f | | | |
| $f_1$ | = 0.778f | | | |
| F/5.5 | f = 100 | β = −0.09449 | ω = 18.8° | |

TABLE 9

| Surface | r | d | $N_d$ | $\nu_d$ | Product name of material |
|---------|---|---|-------|---------|--------------------------|
| 1 | 28.874 | 11.877 | 1.77250 | 49.6 | LASF-n7 (Sumita) |
| 2 | 45.406 | 2.011 | | | |
| 3 | −86.801 | 2.413 | 1.68893 | 31.2 | SF-8 (Sumita) |
| 4 | 30.421 | 2.923 | | | |
| 5 | 61.789 | 7.962 | 1.80325 | 46.7 | LASF-N6 (Sumita) |
| 6 | −61.789 | | | | |

TABLE 10

| | | | | |
|---|---|---|---|---|
| $r_4$ | = 0.304f | | | |
| $f_2$ | = −0.324f | | | |
| $f_2/f_3$ | = −0.819 | | | |
| $r_4/r_5$ | = 0.492 | | | |
| $r_1/r_4$ | = 0.949 | | | |
| $d_2$ | = 0.0201f | | | |
| $f_1$ | = 0.782f | | | |
| F/5.5 | f = 100 | β = −0.09449 | ω = 18.8° | |

What is claimed is:

1. An image readout imaging lens comprising, successively from an object side, a first lens made of a positive meniscus lens having a convex surface directed onto the object side, a second lens make of a biconcave lens, and a third lens made of a biconvex lens, wherein the following conditional expressions (1) to (6):

$$-0.36f < f_2 < -0.25f \quad (1)$$

$$-1.07 < f_2/f_3 < -0.74 \quad (2)$$

$$0.26f < r_4 < 0.32f \quad (3)$$

$$0.43 < r_4/r_5 < 0.77 \quad (4)$$

$$0.82 < r_1/r_4 < 1.05 \quad (5)$$

$$0.018f < d_2 < 0.026f \quad (6)$$

wherein f is a focal length of the whole system;

$f_2$ is a focal length of the second lens;

$f_3$ is a focal length of the third lens;

$r_1$ is a radius of curvature of the first surface;

$r_4$ is a radius of curvature of the fourth surface;

$r_5$ is a radius of curvature of the fifth surface;

$d_2$ is an axial air gap between the first and second lenses are satisfied.

2. An image readout imaging lens according to claim 1, wherein the following conditional expressions (7):

$$0.75f < f_1 < 1.33f \quad (7)$$

wherein $f_1$ is a focal length of the first lens are satisfied.

3. An image readout imaging lens according to claim 1, wherein each of said lenses is constituted by a material which contains neither lead nor arsenic.

4. An image readout apparatus comprising the image readout imaging lens of claim 1.

* * * * *

UNITED STATES PATENT AND TRADEMARK OFFICE
CERTIFICATE OF CORRECTION

PATENT NO.   : 6,018,410
DATED        : January 25, 2000
INVENTOR(S)  : Hiromitsu Yamakawa It is certified that error appears in the above-identified patent and that said Letters Patent is hereby corrected as shown below:

Column 8, line 26 (Claim 1), please delete the word "make" and substitute therefore ---made---.

Signed and Sealed this

Sixth Day of February, 2001

Attest:

Q. TODD DICKINSON

*Attesting Officer*    *Director of Patents and Trademarks*